(12) United States Patent
Chapman et al.

(10) Patent No.: US 11,845,585 B2
(45) Date of Patent: Dec. 19, 2023

(54) CONDIMENT STORAGE HOLDER

(71) Applicant: Freshlink Product Development, LLC, Montclair, NJ (US)

(72) Inventors: Dean Chapman, Montclair, NJ (US); Benjamin Broerman, Hoboken, NJ (US)

(73) Assignee: Freshlink Product Development, LLC, Montclair, NJ (US)

( * ) Notice: Subject to any disclaimer, the term of this patent is extended or adjusted under 35 U.S.C. 154(b) by 0 days.

(21) Appl. No.: 17/674,592

(22) Filed: Feb. 17, 2022

(65) Prior Publication Data

US 2023/0257162 A1    Aug. 17, 2023

(51) Int. Cl.
| | |
|---|---|
| *B65D 21/02* | (2006.01) |
| *B65D 63/10* | (2006.01) |
| *B65D 1/24* | (2006.01) |
| *B65D 85/30* | (2006.01) |

(52) U.S. Cl.
CPC ......... *B65D 21/0233* (2013.01); *B65D 1/243* (2013.01); *B65D 21/0212* (2013.01); *B65D 63/109* (2013.01); *B65D 85/305* (2013.01); *B65D 2501/24286* (2013.01)

(58) Field of Classification Search
CPC ............ B65D 21/0233; B65D 21/0212; B65D 63/109; B65D 1/243; B65D 1/246; B65D 85/305; B65D 2501/24286
USPC ....................................................... 220/510
See application file for complete search history.

(56) References Cited

U.S. PATENT DOCUMENTS

| | | | |
|---|---|---|---|
| 2,158,550 A | 5/1939 | Merritt | |
| 5,265,729 A | 11/1993 | Carlin | |
| 6,230,969 B1 * | 5/2001 | Spransy | ............ B65D 81/3205 |
| | | | 229/906 |
| 2007/0170132 A1 | 7/2007 | Bertrand et al. | |
| 2013/0213855 A1 * | 8/2013 | Orgeldinger | ....... B65D 11/1833 |
| | | | 206/774 |
| 2020/0037759 A1 | 2/2020 | Ward | |

FOREIGN PATENT DOCUMENTS

DE      202019103363 U1    12/2019

OTHER PUBLICATIONS

Search Report issued to European counterpart application No. 22162711.0 by the EPO dated Sep. 2, 2022.

* cited by examiner

*Primary Examiner* — Andrew D Perreault
(74) *Attorney, Agent, or Firm* — Akerman LLP; Peter A. Chiabotti

(57) ABSTRACT

A storage holder for receiving a plurality of condiment bottles includes a base seat defining a receiving space having an upper opening, and a plurality of carrying units removably engaged with the base seat and mounted in the receiving space to partition the receiving space into a plurality of receiving compartments which are arranged in a front-rear direction. Each carrying unit is configured for a plurality of the condiment bottles to be mountable thereon and arranged in a left-right direction so as to conveniently store and get access to the condiment bottles.

7 Claims, 4 Drawing Sheets

CONDIMENT STORAGE HOLDER

FIELD

The disclosure relates to a storage holder, and more particularly to a condiment storage holder.

BACKGROUND

To make dishes more delicious and more variable, a variety of condiments and seasoning packages have become an indispensable part of cooking, and thus storage management of condiment bottles and packs is increasingly important. A conventional condiment holder, such as a rack or a shelf, is provided for placement of condiment bottles. The condiment bottles are placed in a cluttered manner, being inconvenient for the user to pick up, and being easy to overturn. Moreover, the overlapping arrangement of the bottles makes the labels thereon difficult to read and find.

SUMMARY

Therefore, an object of the disclosure is to provide a condiment storage holder that can alleviate at least one of the drawbacks of the prior art.

According to the disclosure, the condiment storage holder for receiving a plurality of condiment bottles includes a base seat which defines a receiving space having an upper opening, and a plurality of carrying units which are removably engaged with the base seat and mounted in the receiving space to partition the receiving space into a plurality of receiving compartments that are arranged in a front-rear direction. Each of the carrying units is configured for a plurality of the condiment bottles to be mountable thereon and arranged in a left-right direction. With the carrying units removably engaged in the base seat and respectively carrying the plurality of the condiment bottles, the condiment bottles are conveniently and neatly stored.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
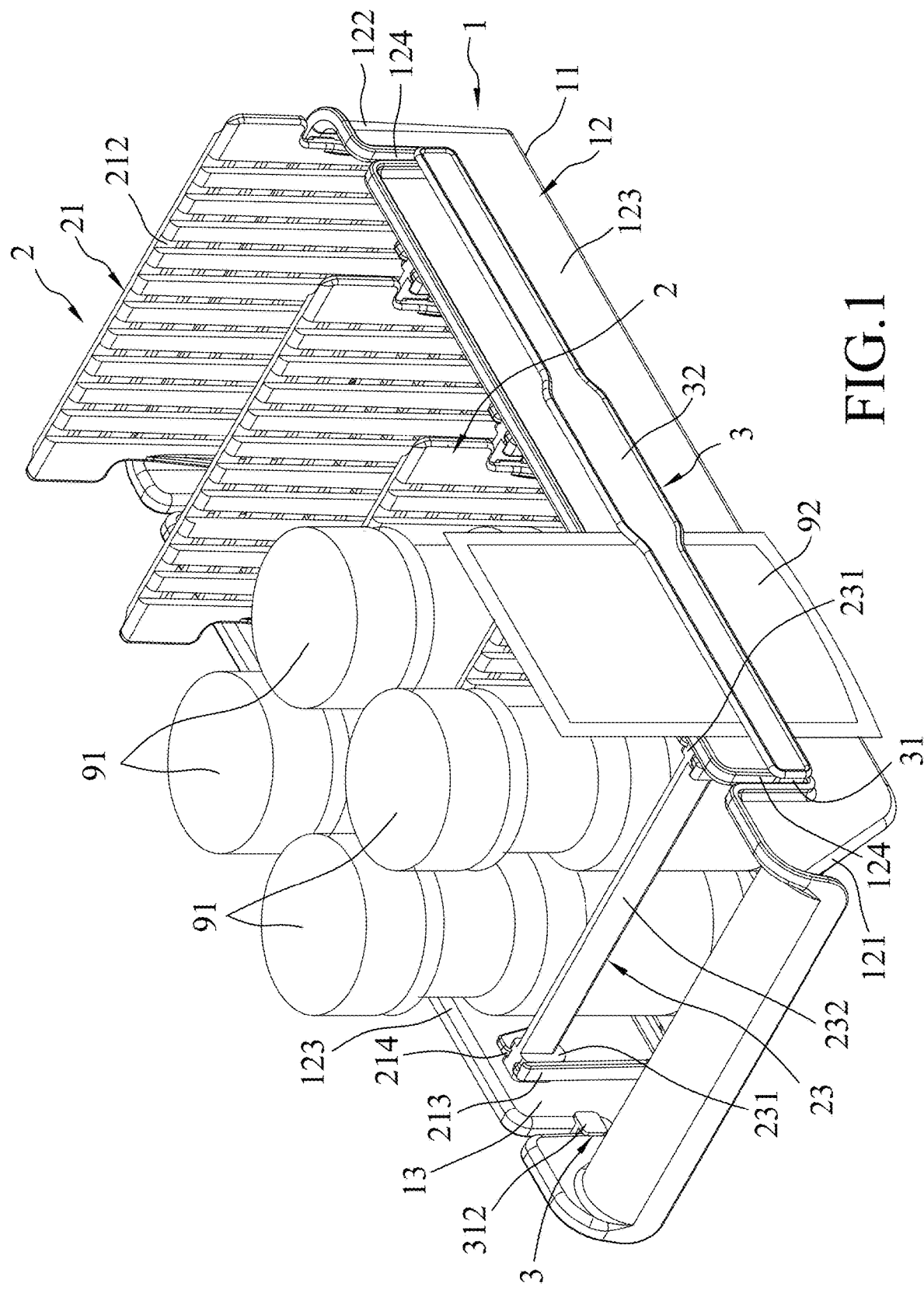
FIG. 1 is a perspective view illustrating an embodiment of a condiment storage holder according to the disclosure.
Figure 2:
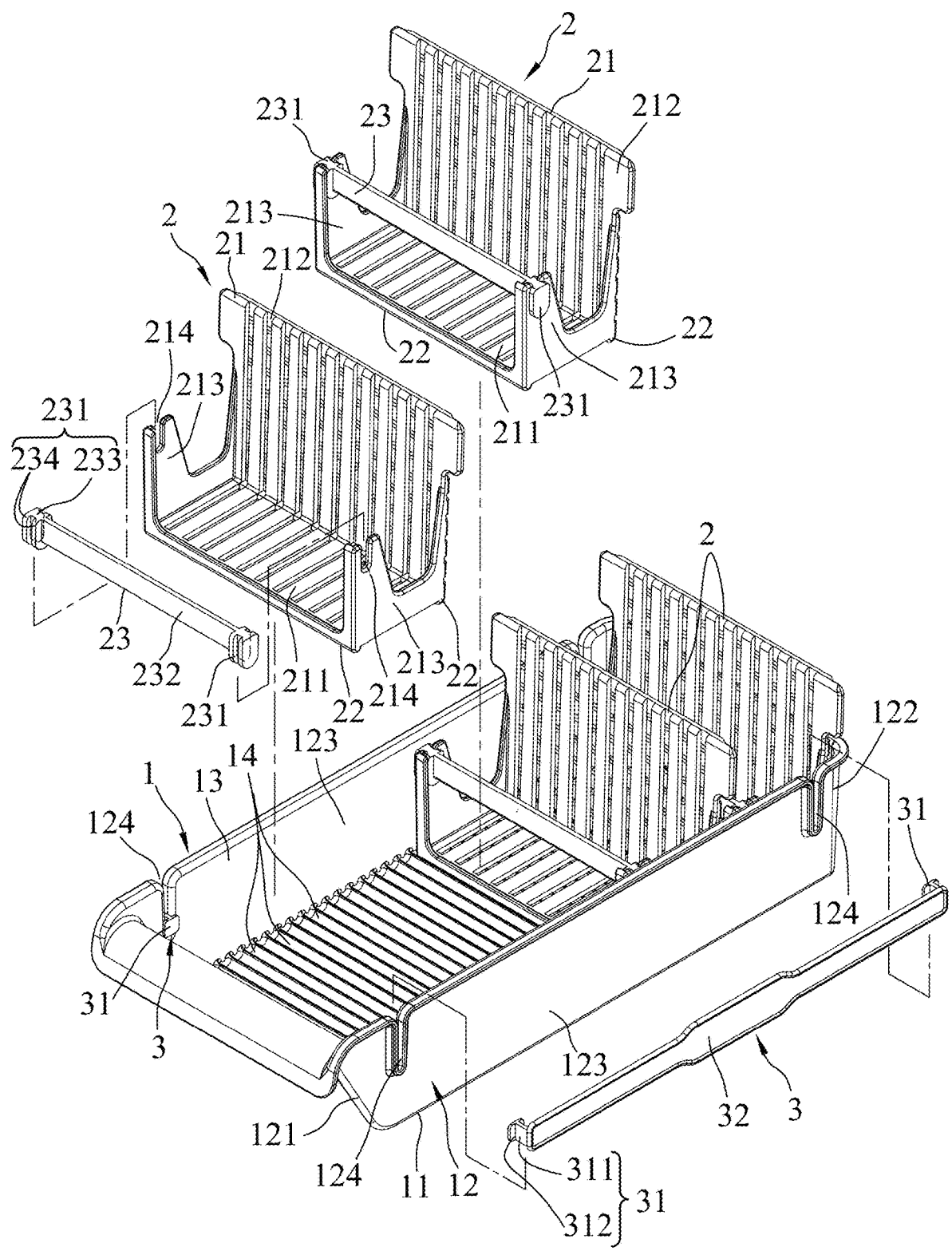
FIG. 2 is an exploded perspective view of the embodiment.
Figure 3:
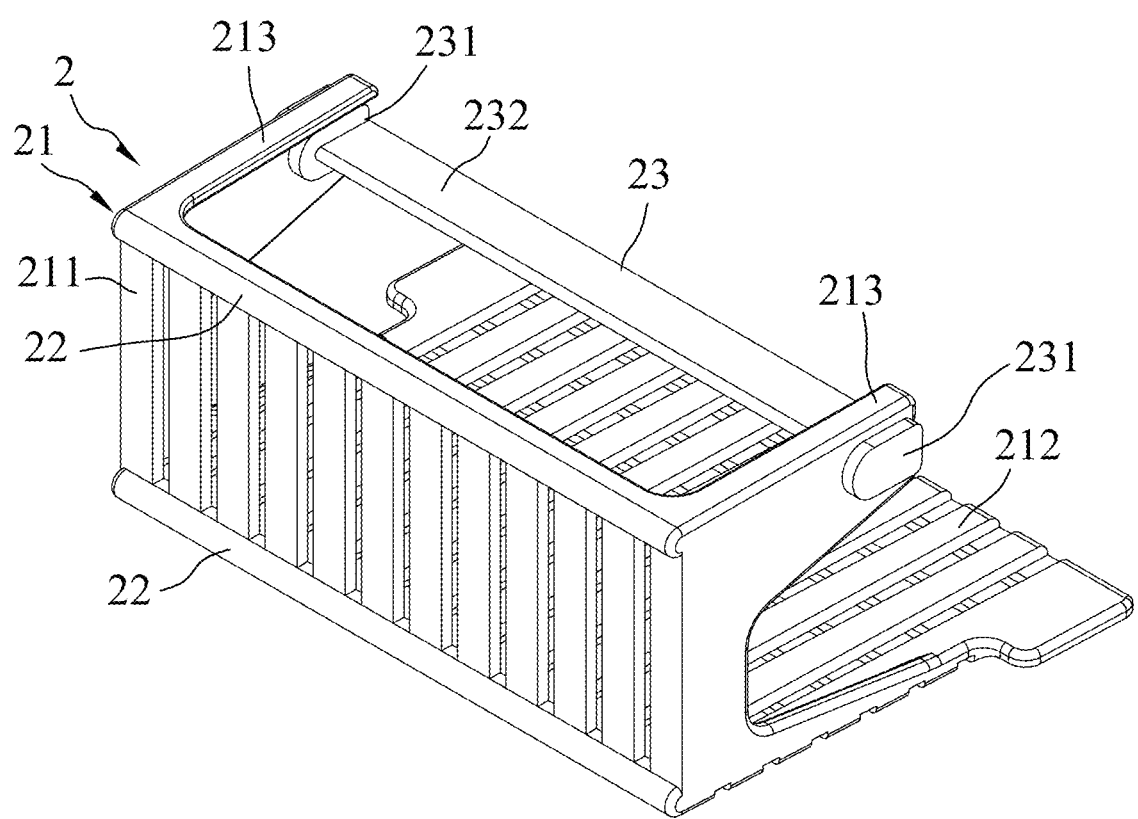
FIG. 3 is a perspective view of a carrying unit of the embodiment.

Referring to FIGS. 1 to 3, an embodiment of a condiment storage holder according to the disclosure is adapted for receiving a plurality of condiment bottles 91 and condiment packs 92. The condiment storage holder includes a base seat 1 defining a receiving space 13 having an upper opening, a plurality of carrying units 2 removably engaged with the base seat 1 and mounted in the receiving space 13 to partition the receiving space 13 into a plurality of receiving compartments which are arranged in a front-rear direction, and two elastic straps 3 removably mounted on an outer wall surface of the base seat 1. Each of the carrying units 2 is configured for a plurality of the condiment bottles 91 to be mountable thereon and arranged in a left-right direction that is transverse to the front-rear direction.

The base seat 1 includes a bottom wall 11 extending in the front-rear direction, and a surrounding wall 12 extending upwardly from a periphery of the bottom wall 11 to cooperatively define the receiving space 13. The bottom wall 11 has a plurality of engaging slots 14 which are formed in an upper wall surface thereof and spaced apart from one another in the front-rear direction. Each of the engaging slots 14 extends in the left-right direction and is opened upwardly to communicate with the receiving space 13. The surrounding wall 12 includes an inclined wall portion 121 which extends from a front end of the bottom wall 11 upwardly and is inclined forwardly and upwardly, an upright rear wall portion 122 which extends from a rear end of the bottom wall 11 upwardly, and two lateral wall portions 123 which respectively and upwardly extend from left and right ends of the bottom wall 11 to interconnect the inclined wall portion 121 and the upright rear wall portion 122. Each of the lateral wall portions 123 has two first connecting features 124 which are spaced apart from and aligned with each other in the front-rear direction.

The carrying units 2 are disposed in and removable upwardly from the receiving space 13 of the base seat 1. Each of the carrying units 2 includes a carrying seat 21 on which the plurality of the condiment bottles 91 are disposed, two engaging ribs 22 which project from a lower surface of the carrying seat 21, extend in the left-right direction, and are separably engaged in two corresponding ones of the engaging slots 14, and a retaining strap 23 which has left and right strap ends secured to the carrying seat 21 and which cooperates with the carrying seat 21 to elastomerically grip the plurality of the condiment bottles 91.

The carrying seat 21 has a lower plate 211 on which the plurality of the condiment bottles 91 are disposed and arranged in the left-right direction, a partition plate 212 which extends upwardly from a rear side of the lower plate 211, and two lateral plates 213 which are spaced apart from each other in the left-right direction and each of which interconnects the lower plate 211 and the partition plate 212. The lateral plates 213 of the carrying seat 21 respectively have first connecting portions 214 which are aligned with each other in the left-right direction.

The two engaging ribs 22 are spaced apart from each other in the front-rear direction, and project from a lower surface of the lower plate 211 to be engageable with the two corresponding ones of the engaging slots 14 to releasably retain the carrying seat 21 in the receiving space 13.

The retaining strap 23 is spaced apart from the partition plate 212 in the front-rear direction, and has two second connecting portions 231 which are respectively and removably connected with the first connecting portions 214, and an elastomeric strap portion 232 which extends in the left-right direction to interconnect the second connecting portions 231 and which cooperates with the partition plate 212 to elastomerically grip the plurality of the condiment bottles 91.

In this embodiment, the first connecting portion 214 of each lateral plate 213 is in the form of a recess which is recessed from an upper rim of the corresponding lateral plate 213 and extends through the corresponding lateral plate 213 in the left-right direction. The second connecting portion 231 of the retaining strap 23 is in the form of a snap fastener with an H-shaped cross-section. The snap fastener has a middle engaging section 233 which is downwardly inserted into the recess 214, and two abutting sections 234 which are disposed at and extend from the middle engaging section 233 in the front-rear direction to abut against inner and outer surfaces of the lateral plate 213. Alternatively, the first and second connecting portions may be in the form of the snap fastener and the recess, respectively. The first and second connecting portions may be of a variety of kinds of connecting structures, such as male and female fasteners.

The elastic straps 3 are removably and respectively mounted on the lateral wall portions 123 of the surrounding wall 12 and outwardly of the outer wall surface of the surrounding wall 12. Each elastic strap 3 includes two second connecting features 31 which are respectively and removably connected with the first connecting features 124 of the corresponding lateral wall portion 123, and an elastic strap body 32 which interconnects the second connecting features 31 to cooperate with the surrounding wall 12 to elastomerically grip the condiment pack 92.

In this embodiment, each first connecting feature 124 of each lateral wall portion 123 is in the form of a recess which is recessed from an upper rim of the corresponding lateral wall portion 123 and extends through the corresponding lateral wall portion 123 in the left-right direction. Each second connecting feature 31 of each elastic strap 3 is in the form of a snap fastener with a T-shaped cross-section. The snap fastener 31 has a middle engaging section 311 which projects from an end of the strap body 32 toward the corresponding lateral wall portion 123, and an abutting section 312 which extends from an end of the middle engaging section 311 in the front-rear direction. The middle engaging section 311 is downwardly inserted into the recess 124, and the abutting section 312 abuts against an inner surface of the corresponding lateral wall portion 123. Alternatively, the first and second connecting features may be in the form of the snap fastener and the recess, respectively. The first and second connecting features may be of a variety of kinds of connecting structures, such as male and female fasteners.

Figure 4:
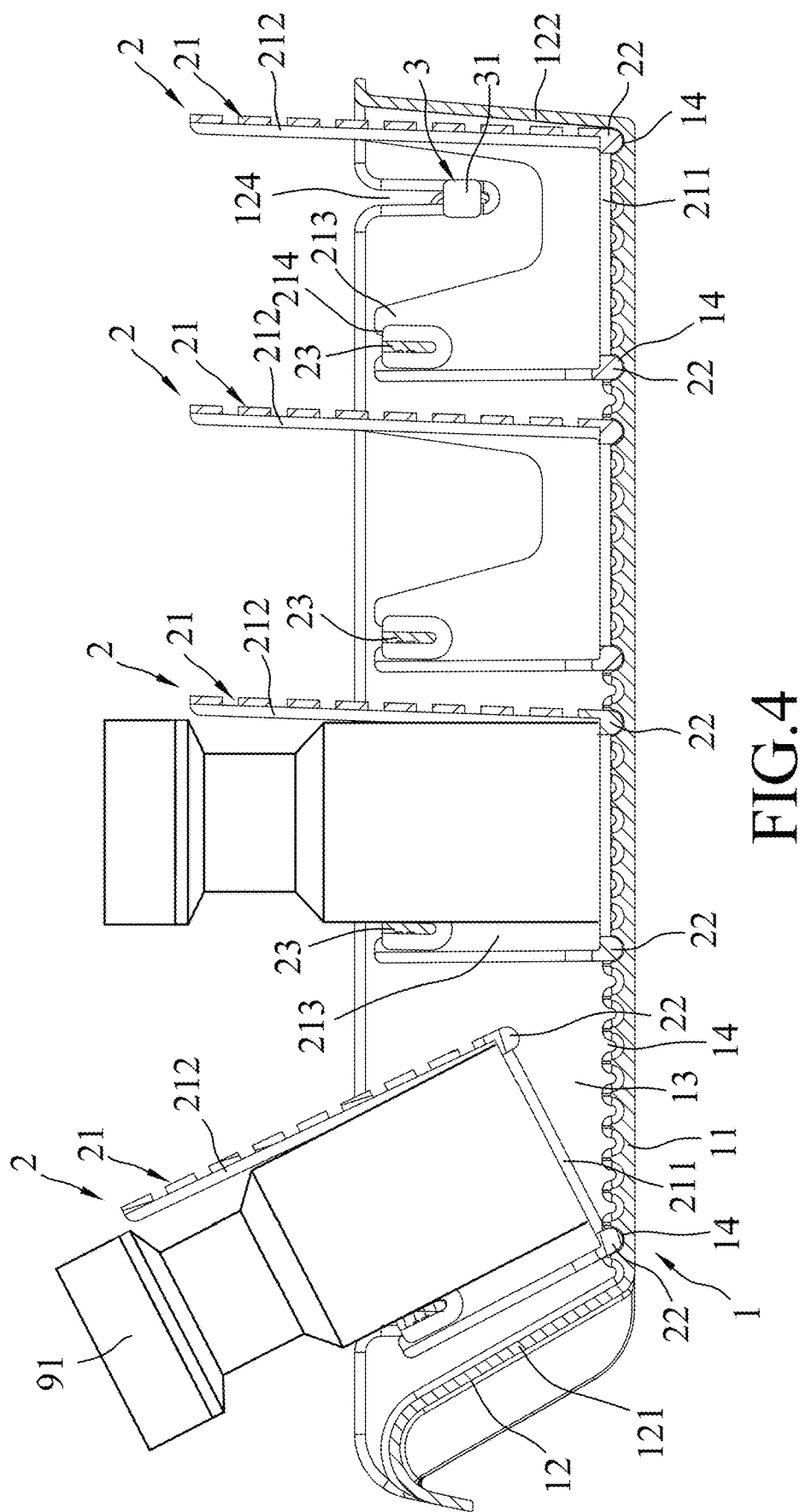
FIG. 4 is a sectional view of the embodiment.

With reference to FIGS. 1, 2 and 4, in use, each of the carrying units 2 is turnable relative to the base seat 1 about one of the engaging ribs 22 between an upright position, where the lower plate 211 is superimposed upon and parallel to the bottom wall 11, and a tilted position, where the carrying unit 2 is tilted toward the inclined wall portion 121 and abuts against one of the inclined wall portion 121 and an adjacent one of the carrying units 2. Such design enables a user to easily tilt the carrying units 2 forwardly one by one to the tilted position when he/she desires to look for one of the condiment bottles 91 so as to facilitate viewing of labels on or condiments in the condiment bottles 91.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A storage holder for receiving a plurality of condiment bottles, comprising:
    a base seat including a bottom wall and a surrounding wall which extends upwardly from a periphery of said bottom wall to cooperatively define a receiving space having an upper opening;
    a plurality of carrying units removably engaged with said base seat and mounted in said receiving space to partition said receiving space into a plurality of receiving compartments which are arranged in a front-rear direction, each of said carrying units being configured for a plurality of the condiment bottles to be mountable thereon and arranged in a left-right direction that is transverse to the front-rear direction; and
    at least one elastic strap disposed on an outer wall surface of said surrounding wall and cooperating with said surrounding wall to elastomerically grip a condiment pack, said surrounding wall having two first connecting features which are aligned with each other in the front-rear direction, said elastic strap including two second connecting features which are respectively and removably connected with said first connecting features, and a strap body which interconnects said second connecting features to elastomerically grip the condiment pack, one of said first and second connecting features being in form of a recess, and the other one of said first and second connecting features being in form of a snap fastener which is removably engaged in said recess,
    wherein said bottom wall of said base seat has a plurality of engaging slots which are formed in an upper wall surface thereof and which are spaced apart from each other in the front-rear direction, each of said engaging slots extending in the left-right direction and being opened upwardly to communicate with said receiving space;
    each of said carrying units including a carrying seat on which the plurality of the condiment bottles are disposed, and at least one engaging rib which projects from a lower surface of said carrying seat, which extends in the left-right direction, and which is separably engaged in a corresponding one of said engaging slots, said carrying seat having a lower plate on which the plurality of the condiment bottles are disposed and arranged in the left-right direction, said at least one engaging rib projecting from a lower surface of said lower plate;
    said surrounding wall of said base seat including an inclined wall portion which extends from one of front and rear ends of said bottom wall upwardly and is inclined away from the other one of said front and rear ends of said bottom wall, each of said carrying units being turnable relative to said base seat about said at least one engaging rib between an upright position, where said lower plate is superimposed upon and parallel to said bottom wall, and a tilted position, where said carrying unit is tilted toward said inclined wall portion and abuts against one of said inclined wall portion and an adjacent one of said carrying units.

2. The storage holder as claimed in claim 1, wherein each of said carrying units includes two of said engaging ribs which are spaced apart from each other in the front-rear direction and which are respectively engaged in two corresponding ones of said engaging slots.

3. The storage holder as claimed in claim 1, wherein said carrying seat has a partition plate which extends upwardly from a side of said lower plate.

4. The storage holder as claimed in claim 3, wherein each of said carrying units further includes a retaining strap which has left and right strap ends secured to said carrying seat and which is spaced apart from said partition plate in the front-rear direction to cooperatively and elastomerically grip the plurality of the condiment bottles.

5. The storage holder as claimed in claim 4, wherein said carrying seat further has two lateral plates which are spaced apart from each other in the left-right direction and each of which interconnects said lower plate and said partition plate, said left and right strap ends of said retaining strap being respectively secured on said lateral plates.

6. The storage holder as claimed in claim 5, wherein said lateral plates of said carrying seat respectively have first connecting portions which are aligned with each other in the left-right direction, said retaining strap having two second connecting portions which are respectively and removably connected with said first connecting portions, and a strap portion which interconnects said second connecting portions and which cooperates with said partition plate to elastomerically grip the plurality of the condiment bottles.

7. The storage holder as claimed in claim 6, wherein one of said first and second connecting portions is in form of a recess, and the other one of said first and second connecting portions is in form of a snap fastener which is removably engaged in said recess.

\* \* \* \* \*